Figure 1:
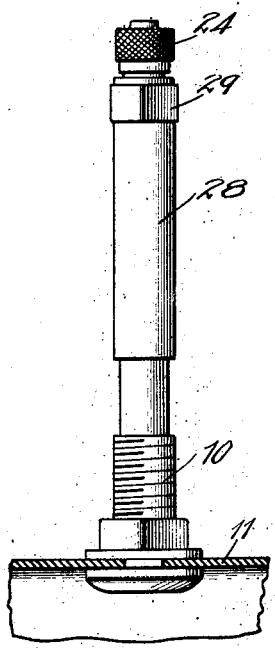

J. W. BLODGETT.
VALVE FOR PNEUMATIC TIRES.
APPLICATION FILED APR. 3, 1913.

1,162,744.

Patented Dec. 7, 1915.

Witnesses:
W. T. Kilroy
Maurice Goldberger

Inventor:
John W. Blodgett
By John Howard McElroy
Atty.

UNITED STATES PATENT OFFICE.

JOHN W. BLODGETT, OF CHICAGO, ILLINOIS.

VALVE FOR PNEUMATIC TIRES.

1,162,744.

Specification of Letters Patent. Patented Dec. 7, 1915.

Application filed April 3, 1913. Serial No. 758,622.

*To all whom it may concern:*

Be it known that I, JOHN W. BLODGETT, a citizen of the United States, and a resident of Chicago, in the county of Cook and State of Illinois, have invented certain new and useful Improvements in Valves for Pneumatic Tires, of which the following is a full, clear, and exact specification.

My invention is concerned with valves for pneumatic tires, and is designed to produce a simple and efficient valve that will operate freely under all conditions, and that can be set to release the air at any desired pressure, and thus avoid possible explosions.

To illustrate my invention, I annex hereto a sheet of drawings, in which the same reference characters are used to designate identical parts in all the figures, of which,—

Figure 2:
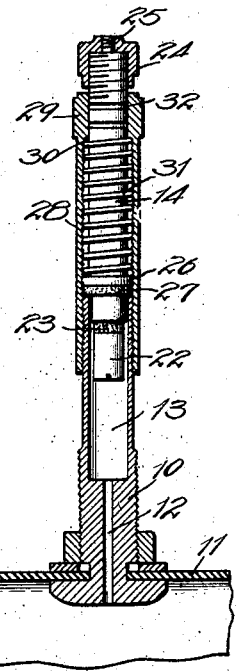
Figure 3:
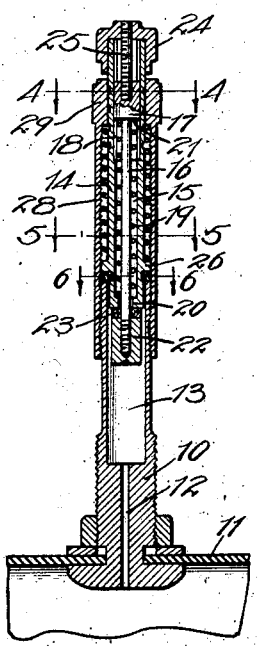
Figure 4:
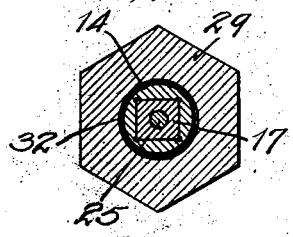
Figure 5:
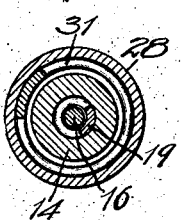
Figure 6:
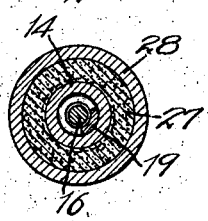

Figure 1 is an elevation of a valve embodying my invention; Fig. 2 is a longitudinal section through a portion of the same; Fig. 3 is a complete longitudinal section; and Figs. 4, 5 and 6 are cross sections, on a larger scale, on the lines 4—4, 5—5, and 6—6, respectively, of Fig. 3.

In carrying out my invention in its preferred form, I employ a tubular base piece 10, which may be provided with any suitable means for securing it to the inner tube 11 of a tire. This base piece has a passage 12 extending therethrough and opening into the tire, and the upper portion 13 of this passage is preferably enlarged, as shown. The outside of the upper end of this tubular base piece is threaded for a purpose to be hereinafter described.

Extending into the upper end of this tubular base piece is a valve tube 14, which has a passage 15 extending therethrough. A valve stem 16 extends substantially through the length of this passage and is prevented from turning therein, preferably by having the enlarged upper end 17 square in cross section and coöperating with an enlarged portion 18 of the passage 15, likewise square in cross section. A helically-coiled expanding spring 19 surrounds the valve stem 16 within the valve tube, being compressed between the flange 20 at the end of the valve tube and the offset 21 formed by the enlargement 17. This helically-coiled expanding spring serves to hold yieldingly the valve 22 against the valve-seat formed by the bottom of the tube 14, and the actual seal between the valve and its seat is formed by the disk 23 of packing material. It will be understood that my invention is not confined to the use of this specific form of valve and valve seat.

The upper end of the valve tube 14 is preferably closed by the cap 24, which has suitable connections with the valve stem 16 for drawing the latter upward so that the valve cannot be accidentally opened. These connections preferably consist of the screw 25 rigidly secured within the cap and extending down into the upper end of the valve tube 14, and screwed into a threaded aperture formed in the upper end of the enlargement 17.

The valve tube 14 has formed near its lower end an annular flange 26, which rests against a packing ring 27 interposed between said flange and the top of the tubular base piece 10. Some means must be provided for holding the flange 26 under pressure against the packing ring 27, and for this purpose I preferably employ the outer sleeve 28, which preferably has a portion 29 thereof hexagonal in its cross section, so that a wrench may be applied thereto if desired. The inside of the lower end of this sleeve is threaded to coöperate with the threaded upper end of the tubular base piece 10; and in a simple form of my construction, this sleeve 28 may have a shoulder 30 on the interior of the upper end thereof coöperating directly with the flange 26. With such a construction, it will be obvious that by screwing the sleeve 28 down until the packing ring 27 is thoroughly compressed, no air can possibly escape from the inner tube, and one way to let the air out would be to unscrew the cap 24 enough so that by depressing it the valve 22 can be unseated. If the sleeve 28 be unscrewed so as to release the pressure on the packing ring 27, the air, of course, can escape at this point. However, instead of employing a short sleeve 28 and having the offset 30 coöperate directly with the flange 26, I preferably employ the structure actually illustrated in the drawings, where the sleeve 28 is long, and a helically-coiled expanding spring 31 is interposed between the shoulder 30 and the upper side of the annular flange 26. By screwing down the sleeve 28, it will be obvious that the pressure under which the packing ring 27 is held may be varied, and, obviously, when the internal pressure in the air tube 11 exceeds the tension of the spring 31, the packing ring 27 will be lifted off of its seat on top of the tubular base piece 10, and the air can escape, and thus prevent the possible bursting of the tire due to the air therein being too highly compressed. By screwing the sleeve 28 down farther, the tension of the spring 31 may be increased. I preferably employ some sort of a gage mechanism to indicate the pressure under which the spring 31 is put, and for this purpose I may conveniently form the annular grooves in the outer side of the top of the valve tube 14, and as the sleeve 28 is screwed down, the grooves 32 are exposed one by one, thus forming an indication of the pressure necessary to blow the valve off automatically and reduce the pressure in the tire to the proper degree.

While I have shown and described my invention as embodied in the form which I at present consider best adapted to carry out its purposes, it will be understood that it is capable of modifications, and that I do not desire to be limited in the interpretation of the following claim except as may be necessitated by the state of the prior art.

What I claim as new, and desire to secure by Letters Patent of the United States, is:

In a valve, the combination with a tubular base piece, of a valve tube having a valve seat therein, an annular flange thereon, a passage extending therethrough having its upper portion angular in cross section, a valve stem extending through said passage and having an enlarged upper end coöperating with the angular portion of said aperture to prevent the stem from turning therein, a valve carried by said stem coöperating with the valve seat, a cap for the upper end of the tube, a screw rigidly secured within the cap and threaded into an aperture formed in the enlarged top of the stem, a packing ring interposed between the base piece and the flange in the valve tube, a sleeve adapted to be screwed on the base piece, and a helically-coiled expanding spring surrounding the tube between the sleeve and the flange which may be compressed sufficiently by the air to raise the valve tube and release the pressure of the tube on the packing ring to release the air.

In witness whereof, I have hereunto set my hand and affixed my seal, this 31st day of March, A. D. 1913.

JOHN W. BLODGETT. [L. S.]

Witnesses:
JOHN HOWARD MCELROY,
MILDRED ELSNER.